Figure 1:
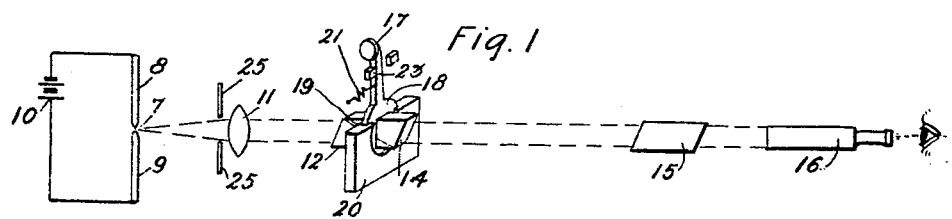

W. WILSON.
SECRET SIGNALING SYSTEM.
APPLICATION FILED DEC. 30, 1916.

1,354,932.

Patented Oct. 5, 1920.

Inventor:
William Wilson.
by A.T. Shunes, Atty.

UNITED STATES PATENT OFFICE.

WILLIAM WILSON, OF EAST ORANGE, NEW JERSEY, ASSIGNOR TO WESTERN ELECTRIC COMPANY, INCORPORATED, OF NEW YORK, N. Y., A CORPORATION OF NEW YORK.

SECRET-SIGNALING SYSTEM.

1,354,932.      Specification of Letters Patent.      Patented Oct. 5, 1920.

Application filed December 30, 1916. Serial No. 139,876.

*To all whom it may concern:*

Be it known that I, WILLIAM WILSON, a subject of the King of Great Britain, residing at East Orange, in the county of Essex and State of New Jersey, have invented certain new and useful Improvements in Secret-Signaling Systems, of which the following is a full, clear, concise, and exact description.

This invention relates to means and methods for secret signaling by apparently steady light beams.

The object of this invention is to provide simple and efficient means for secret signaling by apparently steady light beams of such a character that the variations produced in the beams will be invisible to the naked eye, but can be readily detected by an observer provided with the necessary detecting apparatus as hereinafter described.

For the accomplishment of this purpose this invention makes use of the well-established fact that the human eye unaided is insensitive to many of the qualities or characteristics of light beams. Thus, a light beam, in general, contains light waves that are vibrating transversely in all possible planes parallel to the line of propagation. But, by some suitable means, such as a Nicol prism, it is possible to have the light emitted by said means contain light waves that are vibrating in only one plane instead of a plurality of planes. Light emitted by such means is called polarized light. The human eye itself, however, cannot detect polarized light from light that is vibrating in all possible planes, that is, the change from polarized light to non-polarized light is invisible. Polarized light, however, may be detected by the proper apparatus; for example, the light at the transmitting station is polarized by a nicol, and any rotation of the nicol may be detected at the receiving station by the variation in the amount of light through a second nicol held in the path of the rays of light from the first nicol, in a manner hereinafter described in detail. It is also known that two beams of light, which to the eye appear to be exactly alike, may, upon spectroscopic analysis, be readily shown to be quite dissimilar and composed of light of different wave lengths.

This invention, therefore, provides a secret signaling system which consists, at the sending station, of a source of light and means for causing variations, in accordance with the signals to be sent, of one or more of the qualities of the light beam, to which variations the naked eye is insensitive. At the receiving stations means are provided for aiding the eye in detecting said variations.

Figure 2:
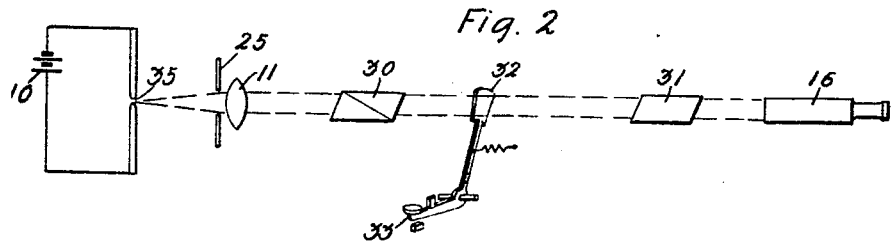
Figure 3:
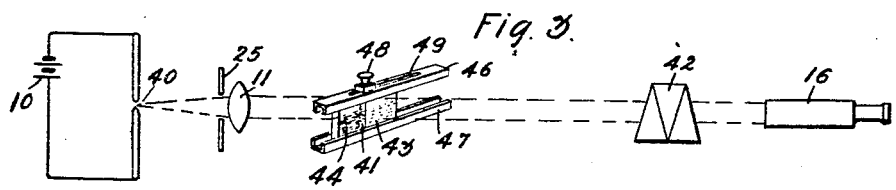
Figure 4:
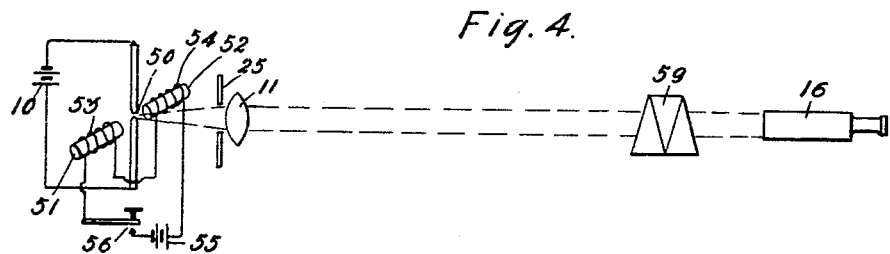
Figure 5:
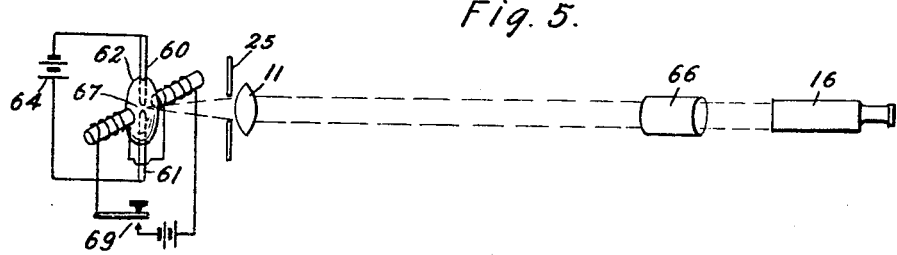

For the better understanding of this invention, reference is made to the accompanying drawings, in which Figure 1 illustrates apparatus for secret signaling by polarized light. Fig. 2 is a modification of Fig. 1. Fig. 3 illustrates means for signaling by changing the wave components of the transmitted light beam in accordance with the signals to be transmitted. In Fig. 4 the secret signaling is accomplished by impressing a magnetic field upon a light source, thereby changing the light from said source in an invisible manner. Fig. 5 is a modification of Fig. 4. Like reference numerals represent like elements in the various figures.

The secret signaling system, illustrated in Fig. 1, is shown part in perspective and part in elevation. 7 is a source of light, shown here as an electric arc, between two electrodes 8 and 9, which are connected to the source of voltage 10. After passing through the condensing lens 11, the light falls upon the Nicol prism 12. As is explained in standard works on optics, the light coming from the face 14 will be plane-polarized, that is, the transmitted vibrations of the light waves will all be in one plane, which plane will be parallel to the axis of the system and the shorter diagonal of the rhombus which constitutes the end of the prism. At the receiving station this polarized light strikes a second nicol 15 the principal section of which is shown to be at right angles to the principal section of nicol 12 but with their principal axes parallel to each other. With the two nicols crossed in such a manner, experiments show that no light will be transmitted through prism 15; and so the observer's eye will detect no light through a telescope 16, which is focused upon said prism. If, however, the principal sections are not at right angles to each other, light proportional to the change from the crossed condition will pass through prism 15. 17 is a key at the transmitting station by means of which the nicol 12 may be rotated away from its position for no light transmission by nicol 15, in accordance with the signals to be transmitted to the receiving station. This key is shown fastened to the cylindrical supporting frame 18 of the nicol, which frame is free to rotate in a groove 19 of the base 20. The spring 21, which is fastened to the key, serves to bring the nicol 12 back to position for zero light at the receiving station.

It is evident that any suitable method, other than the one described, may be employed to rotate the nicol 12, although it is preferable for efficient signaling that the two nicols should be crossed when the key 17 is pressing against the stop 23. Furthermore, this invention is not limited to one in which the polarization is accomplished by a nicol, but any suitable polarizing means may be employed, which may polarize the light in a plane, or may produce elliptically or circularly polarized light. The signaling also may be accomplished by alternately sending light beams polarized in two of the above mentioned ways, such, for example, as alternately transmitting plane-polarized beams and circularly polarized beams. In order to prevent the receiving station from receiving light not transmitted through the nicol 12, a stop 25 is provided which allows light to be transmitted only through the lens 11.

In Fig. 2 it is preferable, as in Fig. 1, that the two nicols 30 and 31 should be crossed. It is known that some transparent substances, such as mica, when placed in the path of a polarized beam of light, rotate the plane of polarization an amount proportional to their thickness. 32 represents a sheet of mica which may be interposed in the path of the polarized beam from the nicol 30. With the mica absent, no light will reach the telescope 16 through the nicol 31, as the two nicols are crossed; but the interposition of the mica 32 will produce a rotation in the plane of polarization which, as explained above, will permit light to pass through nicol 31 to the telescope 16. The insertion of the mica plate will not noticeably affect the intensity of the light sent out from the transmitter. Fastened to the mica sheet is a key 33 by means of which the position of the mica may be controlled with respect to the path of the polarized beam. The operation of this key, in accordance with the signals to be sent, will, therefore, cause corresponding flashes of light through nicol 31, thereby permitting said signals to be detected by the telescope 16. 35 is a source of light similar to source 7 of Fig. 1.

In the secret signaling system of Fig. 3, 40 is a source of light similar to the one in Fig. 1. 41 is a vessel in the path of the light from said source, containing in different compartments two media apparently transmitting light of the same color, but differing, however, in their light wave constituents. At the receiving station, means, shown here as a prism 42 of a direct-vision spectroscope, is provided for detecting said difference in the light emitted by the two media. In the illustration the two media are represented by two solutions, 43 and 44, of apparently the same color. 43 may be a solution of neodymium ammonium nitrate and solution 44 may be a solution of fuchsin, as solutions of these two compounds may be made of such a strength that apparently they are of the same color. If, now, the solution 43 is in the path of the light beam, the light transmitted through said solution to the receiving station will be dispersed into its elementary colors by the prism of the spectroscope. When the solution 44 is moved into the path of the light beam, the light emitted by it will likewise be dispersed into its elementary colors which, however, will be different from those of solution 43. If, now, means is provided for alternately placing these two solutions in the path of the light beam, in accordance with the signals to be transmitted, the analysis of the light by the spectroscope, as seen through telescope 16, will vary in accordance with said signals. In order to provide such a means, the vessel is shown supported by the two rails 46 and 47 between which the vessel may slide back and forth. 48 is a handle working in a slot 49 in the member 46 and is fastened to the vessel, thereby affording a ready means for moving said vessel.

In Fig. 4, 50 is a source of light in a magnetic field produced by the two magnetized cores 51 and 52 of the solenoids 53 and 54, respectively. 55 is a source of current therefor and 56 is a means, shown here as a key, for closing the circuit containing said solenoids and the source of current. When this circuit is open the light received at the receiving station by the prism 59 of the spectroscope will be dispersed into its characteristic wave components, which may be observed by the telescope 16. If, now, the key 56 is closed, the magnetic field produced will change the wave components of the light emitted by the source 50, which changes, commonly known as the Zeeman effect, may be detected by the corresponding changes in the analysis of the light by the spectroscope at the receiving station. Hence, if the key 56 is opened and closed in accordance with the signals to be transmitted, corresponding changes will be detected in the analysis of the light at the receiving station whereby the signals may be read.

In Fig. 5 the two electrodes 60 and 61 are inclosed in a vessel 62 containing a gas, such as sodium vapor, preferably at a low pressure. The spark discharge between the electrodes, due to the source of voltage 64, will be characteristic of the gas contained in said vessel. Experiment has shown that the light from such a source may be entirely absorbed in passing through a layer of similar gas of sufficient thickness which is at a lower temperature than the gas at the source. At the receiving station 66 is a vessel containing the same gas as vessel 62 at the sending station, and at a lower temperature. If we assume that the length of the vessel, as shown, is sufficient, no light from the source 67 at the transmitting station will pass through said vessel, and, consequently, there will be darkness in the telescope 16. But if the magnetic field is applied to said light source by closing key 69, thereby creating a magnetic field in a similar manner as in Fig. 4, the wave components of the source 67 will be changed correspondingly, that is, new wave lengths will be present in the light emitted. It has been found that these new wave lengths are outside of the absorption region for the cooler gas or vapor in the vessel 66 at the receiving station. Consequently, the light made up by these wave lengths will pass through said vessel and may be received by the telescope. Therefore, if the key 69 is opened and closed in accordance with the signals to be transmitted, corresponding flashes of light will be observed in the telescope, thereby affording signaling means between the two stations.

It is to be noted that the changes produced in the light beams in the various systems, above described, are not apparent to any one not supplied with the proper receiving apparatus.

Various modifications may be made in the above mentioned systems without departing in any wise from the spirit of the invention as set forth in the appended claims.

What is claimed is:

1. In a secret signaling system a transmitting station, a receiving station physically remote from said transmitting station, said transmitting station comprising a single source of light, and means for varying an invisible characteristic of the light from said single source while keeping substantially constant the intensity of said light, said receiving station comprising means whereby said variations are made visible by rays from said source that are within the range of visibility.

2. In a secret signaling system a transmitting station, a receiving station physically remote from said transmitting station, said transmitting station comprising a single source of light, means interposed in the path of a beam of light from said source for varying an invisible characteristic of said light while keeping substantially constant the intensity of said light, said receiving station comprising means dependent upon the visible radiations of said source for making discernible said invisible variations.

3. The method of secret signaling between stations which comprises at one station, polarizing a light beam in accordance with the signals to be transmitted and at another station physically remote from said first station, detecting said polarization.

4. The method of secret signaling between stations which comprises at one station producing a light beam having a variable plane of polarization, transmitting said beam with constant intensity to a second station physically remote from said first station, and at said second station detecting the variations of the plane of polarization of said light beam.

5. In a secret signaling system, a transmitting station and a receiving station physically remote from said transmitting station, said transmitting station comprising a source of polarized light, means for changing the character of said polarized light in accordance with the signals to be sent, and means at the receiving station for detecting said changes, said changes being transmitted invisibly between said stations.

6. In a secret signaling system, a transmitting station and a receiving station physically remote from said transmitting station, said transmitting station comprising a source of polarized light, means for changing the direction of said polarization in accordance with the signals to be sent, said receiving station comprising means for detecting said changes, said changes being transmitted invisibly between said stations.

7. In a secret signaling system, a transmitting station and a receiving station physically remote from said transmitting station, said transmitting station comprising a source of light, and means for polarizing said light in accordance with the signals to be sent, said receiving station comprising means for detecting said polarization.

8. In a secret signaling system, a transmitting station and a receiving station physically remote from said transmitting station, said transmitting station comprising a source of polarized light, and means for varying the plane of the polarization of said light, said receiving station comprising means for detecting said variations, said variations being transmitted invisibly between said stations.

9. In a secret signaling system, a transmitting station and a receiving station physically remote from said transmitting station, said transmttiing station comprising a source of plane-polarized light, means for rotating the plane of said polarization in accordance with the signals to be sent, said receiving station comprising means for detecting said rotation, said variations of the plane of polarization being transmitted invisibly between said stations.

10. In a secret signaling system, a transmitting station and a receiving station, said transmitting station comprising a source of light, a Nicol prism adapted to plane-polarize the light from said source, means for rotating said prism in accordance with the signals to be sent, thereby varying the plane of said polarized light, said receiving station comprising a second Nicol prism adapted to detect said rotations.

11. In a secret signaling system, a transmitting station and a receiving station, said transmitting station comprising a Nicol prism and a source of light therefor, a second Nicol prism at said receiving station, said Nicol prisms having their principal sections at right angles to each other, thereby allowing no light to pass through said second Nicol prism, means for rotating said first prism in accordance with the signals to be sent, thereby permitting the light to pass through said second prism whereby said signals may be detected.

12. In a signaling system, a transmitting station and a receiving station physically remote from said transmitting station, means for signaling invisibly between said stations, said means comprising at said transmitting station a source of light and means interposed in the path of a beam from said source for varying an invisible characteristic of said light while keeping substantially constant the intensity of said light and means at said receiving station whereby said variations are made visible by rays of light from said source that are within the range of visibility.

In witness whereof, I hereunto subscribe my name this 29th day of December, A. D., 1916.

WILLIAM WILSON

| | | |
|---|---|---|
| Zickler | 625,823 | 250-11 |
| German | 165,441 | 250-7 |
| German | 30,105 | 178-6 |
| British | 11,269 of 1902(nodrg) | 250-2 |
| Tesla | 685,957 | 250-2 |
| De Moura | 775,337 | 250-7 |
| " | 775,846 | 250-7x |
| King | 324,560 | 88-14 |
| Priest | 1,672,166 | " |
| Morsell | 535,218 | " |
| French | 418,373 | 250-8 |

Wireless Telephony by Ruhmer, 1908 page 74.